*I. P. Tice's Imp't in Windmills.*

№ 74632

PATENTED
FEB 18 1868

Witnesses:
J. M. Coombs
A. Sellers

I. P. Tice
per Brown, Coombs & Co.
Atty

United States Patent Office.

ISAAC P. TICE, OF NEW YORK, N. Y.

Letters Patent No. 74,632, dated February 18, 1868.

---

IMPROVEMENT IN WINDMILLS.

---

The Schedule referred to in these Letters Patent and making part of the same.

---

TO ALL WHOM IT MAY CONCERN:

Be it known that I, ISAAC P. TICE, of the city, county, and State of New York, have invented a new and useful Improvement in Windmills, of which the following is a full, clear, and exact description, reference being had to the accompanying drawings forming part of this specification, and in which—

Figure 1:
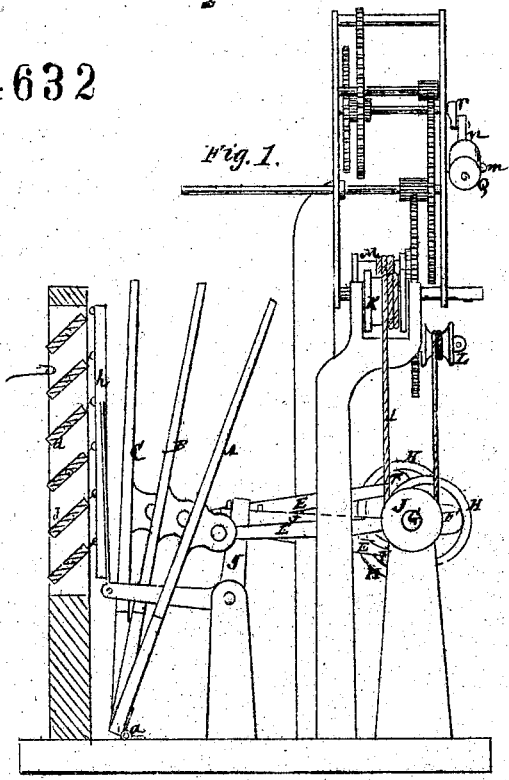
Figure 2:
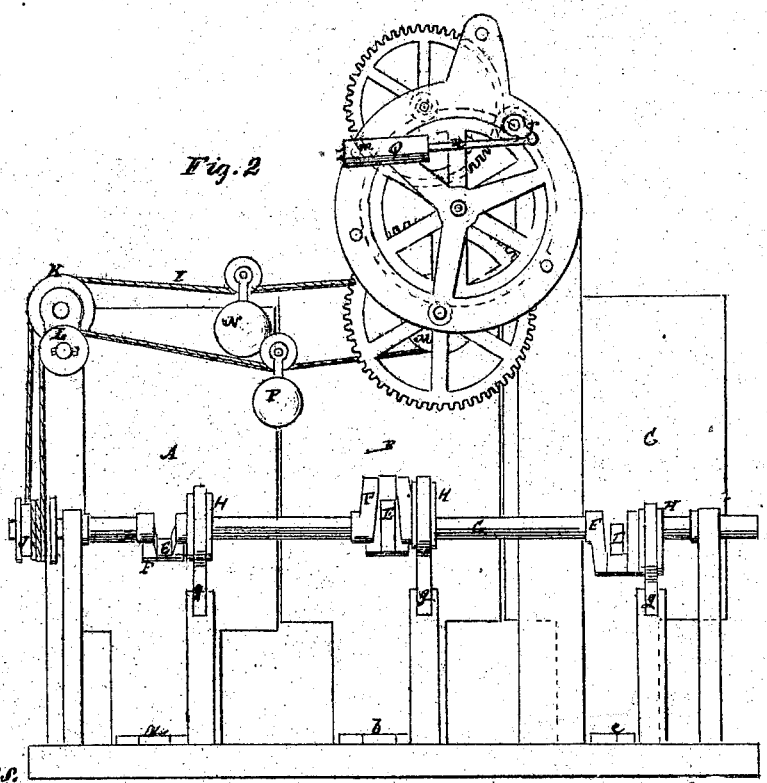

Figure 1 represents a vertical section, at right angles, through the wind-boards or vanes of a mill or apparatus constructed in accordance with the invention; and Figure 2 a rear elevation of the same.

Similar letters of reference indicate corresponding parts.

My invention consists in a combination of independent wind-boards opposed to the direct action of the wind, and arranged to reciprocate intermediately or alternately relatively to each other, under the control of valves or shutters, which admit or shut off the wind from said boards in succession, in such a manner as that by a suitable connection of said boards with a many-cranked shaft or other mechanical expedient, and appropriate attachment of the valves or shutters, a continuous motion is kept up by the successive action of the wind-boards, which may either be used direct, as a driving-power, or through the instrumentality of a weight, raised by said force and clock-work or gear under its control, or the equivalents of such appliances may serve to store power for future use.

Referring to the accompanying drawing, A, B, and C represent wind-boards, of which there may be any suitable number hinged, it may be, in the same line or plane, as at $a\ b\ c$, so as to be capable of a swinging backward and forward motion relatively to windows or openings D, one to each wind-board, and provided with shutters or valves $d$, hung on central axes, in order that they may open and close in a similar manner to the slats of a Venetian blind or shutter. E E E are pitmen, connecting the wind-boards A B C with cranks F F F, of a general shaft, G, that are pitched or set at intermediate throws, so that by the successive back action of the several wind-boards, at regular but intermediate intervals relatively to each other, by opening the shutters, $d$, of their respective windows, to expose them to the force of the wind, they serve to rotate and keep up a continuous motion to the shaft G, the shutters $d$ of the several windows being successively or intermediately closed in the return stroke of the wind-boards, to prevent a counteracting influence of the wind, by eccentrics H H H, through rods $f$ and levers $g$, acting on bars $h$, connected with the shutters $d$ of the several windows respectively, and said eccentrics afterwards serving to open the shutters, to re-expose, successively or intermediately, the boards A B C to the wind, which, in producing a backward rocking action of them, keeps up a continuous motion of the shaft G. This action of the wind, it will be perceived, is a direct one upon the faces of the boards; thus the utmost available force is obtained, and wind-slip avoided. Of course the whole apparatus may be hung or suspended, as in the case of a common windmill, to adjust itself to the changing direction of the wind. The shaft G may either be used direct for various driving-purposes, or as a means for communicating power, by belt and pulleys or other gear, to a secondary shaft.

To obviate the irregularity which attaches to wind as a motive-power, it has frequently been proposed to employ the prime-mover as an agent for storing power, by causing it to raise a weight or weights that in their descent operate through suitable mechanism to work a driving-shaft. The utility of such an arrangement in calms or light winds will be readily understood. Such an arrangement or combination with the wind-motor herein previously described, is represented in the drawing, where I is an endless rope or chain, wound round a drum, J, on the shaft G, and over or round sheaves or pulleys K L, to, from, and round a barrel, M. This rope has suspended on it, in one of its lines of run, a weight, N, that, as the shaft G is rotated by the action of the wind-boards, is raised from any suitable depth, by the straightening of such line of run from a sling-like position, through the action on the rope of the drum J, said weight afterwards serving, on its descent, to, through the rope or chain, communicate motion to the barrel M, and from it, by suitable gear or mechanism, to a driving-shaft, O. A second weight, P, may be applied to the rope or chain to keep the slack steady, and prevent its entanglement with other parts.

Operating in connection with such or other like powers, as, for instance, with the train of wheels of which the storing-power is composed, is a pneumatic or fluid drag, to produce uniformity of speed in the action of the motor or driving-shaft, that without a controlling device would be subject, from the character and action of the driving force, to great irregularity in velocity. This pneumatic or fluid drag is represented as consisting of a cylinder, Q, having a small orifice, m, at or near its one or closed end, or it may be, where both ends are closed, provided with orifices at or near opposite ends, said cylinder being fitted with a piston that is reciprocated by a rod, n, through a crank, r, driven by the train of gearing as before referred to, so that on there being any tendency to acceleration in speed of the driving-shaft, the piston attached to the rod n will be proportionately quickened and made to encounter increased resistance by a more forcible expulsion of the air within the cylinder Q, through the orifice m, or greater compression of the air within said cylinder than there is free escape for, thus causing the piston to act as a drag, which, as the speed slackens again, relieves itself by the slower action of the piston, and consequently readier escape for the air through the orifice in the end of the cylinder.

What is here claimed, and desired to be secured by Letters Patent, is—

The combination, with the many-cranked driving-shaft G, or other suitable driving-mechanism, of the reciprocating wind-boards A B C, differently pitched or set for successive action in like directions, intermediately to each other, and controlled by valves or shutters d, substantially as specified.

ISAAC P. TICE.

Witnesses:
    J. W. COOMBS,
    A. LE CLERC.